(No Model.)
V. C. COLLET.
BRIDLE.
No. 359,060. Patented Mar. 8, 1887.
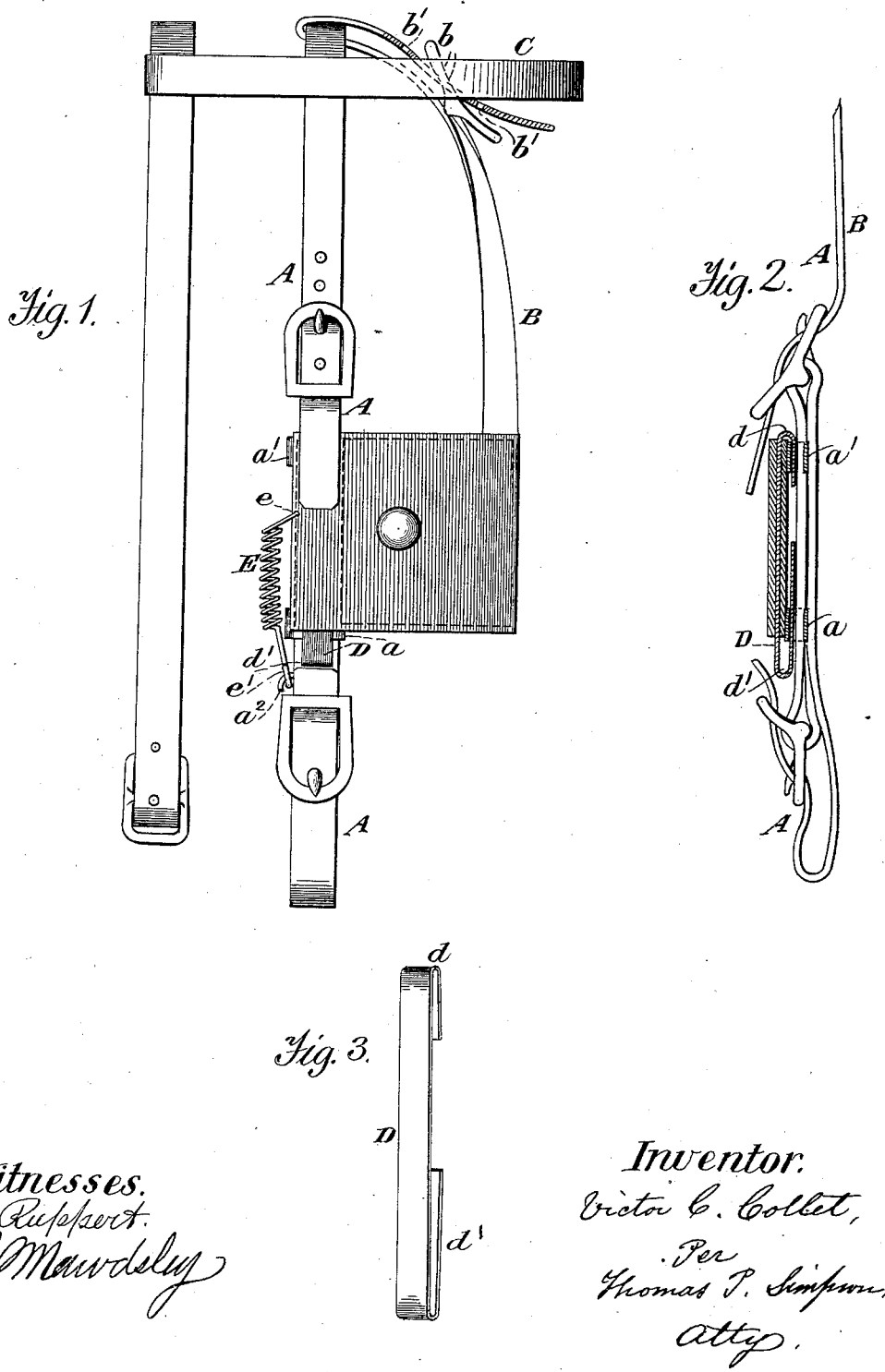
Witnesses.
A. Ruppert.
J. Mawdsley
Inventor.
Victor C. Collet,
Per
Thomas P. Simpson,
Atty.

UNITED STATES PATENT OFFICE.

VICTOR C. COLLET, OF HOHEN SOLMS, LOUISIANA.

BRIDLE.

SPECIFICATION forming part of Letters Patent No. 359,060, dated March 8, 1887.

Application filed September 29, 1886. Serial No. 214,848. (No model.)

*To all whom it may concern:*

Be it known that I, VICTOR C. COLLET, a citizen of the United States, residing at Hohen Solms, in the parish of Ascension and State of Louisiana, have invented certain new and useful Improvements in Bridles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to enable the blinds of a bridle to be readily detached from the cheek-straps in order that the same bridle may be conveniently used with or without blinds, some horses working best with blinds while others work best without them.

Figure 1 of the drawings is a side elevation of a bridle provided with my improvement; Fig. 2, a vertical section of the cheek-strap and blind to show the position of the fastenings, and Fig. 3 a detail view of the hook-plate.

In the drawings, A represents the cheek-straps connected, as usual, by buckles with the other parts of a bridle; B, the bifurcated strap made fast to the upper outer corner of blinds and connecting adjustably by the buckle $b$ and holes $b'$ with the head-piece C.

D is a hook-plate having a short hook, $d$, and a comparatively long one, $d'$, the body thereof being rigidly held between the two leather plies of the blind.

The long hook $d'$ is first put into the lowest keeper, $a$, of the cheek-strap, and the blind raised until the short hook $d$ will pass down into the upper keeper, $a'$. Then by adjusting the strap so as to raise the blinds higher or lower, according to the length of the horse's head, the blinds may be adapted to any horse; or by unbuckling said strap the blinds may be quickly detached from the bridle. In order to hold the blinds more securely in position, I sometimes employ a spiral spring, E, which is fastened to the edge of the blind at $e$, and is provided with a hook, $e'$. The latter may be detachably engaged with an eye or down-hook, $a^2$, on the rear edge of the cheek-strap, so as not to interfere with the rapid and easy removal of the blind.

Having thus described all that is necessary to a full understanding of my invention, what I claim as new and of my invention, and desire to protect by Letters Patent, is—

1. The blind of a bridle, having the hook-plate D, provided with the end hooks, $d\ d'$, varying in length and secured between its plies, to adapt it to be used as described.

2. The combination, with blinds and cheek-straps, of an adjustable connection with the head-piece C, the plate D, having hooks $d\ d'$, and the keepers $a\ a'$ on the cheek-straps, whereby the blinds may be adjusted to different horses.

3. The combination, with blinds and cheek-straps connected by hooks and eyes or keepers, of the spiral springs E E, fastened at $e$ to the blind and by a hook, $e'$, to an eye or down-hook on cheek-strap, as shown and described.

In testimony whereof I affix my signature in presence of two witnesses.

VICTOR C. COLLET.

Witnesses:
 J. R. COLLET,
 CHAS. J. BUSH.